Aug. 23, 1932.  C. A. SABBAH ET AL  1,873,667

MEASUREMENT OF RECTIFIER VOLTAGES

Filed June 26, 1931

Inventors
Camil A. Sabbah
Chancy F. Whitney
by *Charles E. Mullen*
Their Attorney.

Patented Aug. 23, 1932

1,873,667

UNITED STATES PATENT OFFICE

CAMIL A. SABBAH, OF SCHENECTADY, AND CHANCY F. WHITNEY, OF SCOTIA, NEW YORK, ASSIGNORS TO GENERAL ELECTRIC COMPANY, A CORPORATION OF NEW YORK

MEASUREMENT OF RECTIFIER VOLTAGES

Application filed June 26, 1931. Serial No. 547,072.

Our invention relates to electric measurements and in particular to a method of determining the voltage drop existing in mercury arc rectifiers.

In the practicable operation of mercury arc rectifiers for power purposes, it is desirable to know the drop in voltage between the various anodes and the cathode during the time the anodes are passing current in order to ascertain that the rectifier is in proper operating condition. This voltage drop may be of the order of about 20 volts on a power rectifier supplying a 3000 volt direct-current circuit when the current per anode is, say, 100 amperes. However, the voltage across an anode and cathode rises to several thousand volts during the portion of the voltage wave when power current is not flowing therebetween but has shifted to some other anode. It therefore does not appear possible to measure the lower operating voltage directly with a voltmeter. In accordance with our invention we measure the power and the current of the rectifier circuit in question and obtain the voltage by dividing the power measurement by the current measurement. In obtaining the power measurement by means of a wattmeter we preferably shunt the high voltage occurring during the inactive part of the cycle through a small rectifier under certain conditions and for reasons which will appear from the description which follows.

Figure 1:
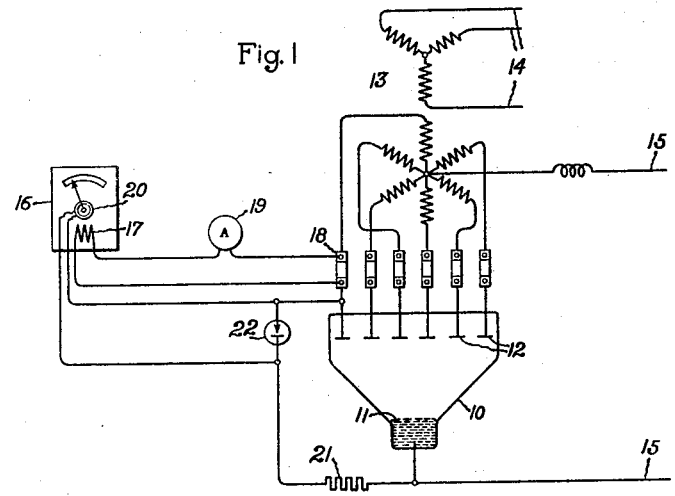
Figure 2:
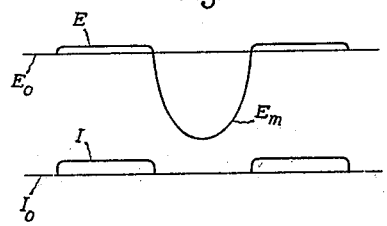
Figure 3:
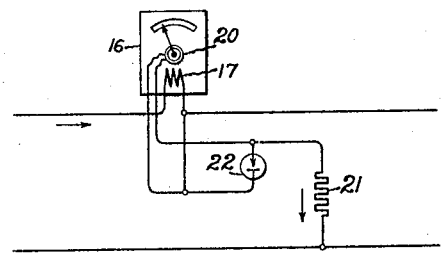

In the drawing, Fig. 1 represents the essential parts of a mercury arc rectifier and its circuit connections together with our measuring equipment in one of the anode circuits, Fig. 2 shows curves representative of current and voltage relations in the measuring circuit of Fig. 1 which will be referred to in explaining the necessity of the present arrangement, and Fig. 3 represents the wattmeter scheme for measuring the direct current energy component of alternating current circuits generally. The features of the invention which are considered to be novel and patentable will be pointed out in the claims appended hereto.

In Fig. 1 of the drawing we have represented a mercury arc rectifier vessel 10, with its cathode 11 and anodes 12. The rectifier is shown supplied through a phase multiplying transformer 13 from a three-phase alternating current supply line 14 and supplying a direct-current circuit 15 connected between the cathode and neutral point of the transformer secondary.

In the operation of such apparatus it is desirable to maintain the proper degree of vacuum, balanced currents between the different anodes, and in general such conditions as will result in good efficiency and safe operation. One reliable indication of the operating conditions of such apparatus is the arc drop voltage or the voltage existing between the anodes and the cathode during that portion of a cycle when an anode is active. This voltage should be substantially the same for all anodes and within certain maximum and minimum values. However, it is difficult if not impossible to measure this voltage directly as will be evident from a consideration of the curves of Fig. 2. The curve I referred to a zero line $I_o$ may be taken to represent the positive current flowing from one of the anodes to the cathode in the normal operation of the device. The curve E referred to a zero line $E_o$ may be taken to represent the positive voltage or the positive arc drop between the cathode and the same anode. During the period when current is flowing the value of I may be 100 amperes and the positive arc drop voltage about 20 volts. However, during the inactive portion of the cycle the voltage rises to very high values in the reverse direction as indicated at $E_m$. This high negative voltage is not correctly plotted with respect to the arc drop voltage E in the curve since to do so is impracticable. However, it may rise to above 6000 volts assuming a rectifier for supplying a 3000 volt direct circuit.

To determine the voltage E, therefore, we employ the measuring means represented in Fig. 1 comprising a direct current wattmeter 16 with its current coil 17 connected across a shunt 18 in the anode circuit. An ammeter 19 is also included in this shunt circuit. The voltage coil 20 of the wattmeter is connected across the vapor rectifier 10 between the anode and cathode and this voltage circuit contains a suitable current limiting resistance 21. We have also shown a small rectifier 22 connected in shunt to the voltage coil 20 of the wattmeter. For the purpose of identifying the rectifiers the small rectifier will hereinafter be termed the instrument rectifier. The instrument rectifier 22 is not always necessary but when used it is connected so as to pass current when the voltage across the main rectifier is negative as at $E_m$ (Fig. 2) and to be inactive when the voltage is in the opposite direction as at E. Thus the main and instrument rectifiers are connected in reverse relation to the circuit in question.

When current passes through the main rectifier from the cathode 11 to the anode connected up to the metering circuit, the wattmeter 16 will indicate the positive energy represented by the current through the anode times the voltage drop in the arc between cathode and anode. The ammeter 19 will measure the current. The voltage drop may then be obtained by dividing the wattmeter reading by the current reading.

In modern high-voltage power rectifiers we have found that there apparently exists a small negative current between anode and cathode during the inactive portion of the cycle represented by voltage $E_m$. In a rectifier such as has been referred to above this may be about .1 ampere. If the negative voltage across the rectifier at this time is 6000 volts, the negative power in the circuit in question will amount to 600 watts which is comparable to 100 amperes × 20 volts or 2000 watts existing during the active portion of the cycle. In order that this so-called negative energy will not influence the wattmeter and cause error in the desired measurement, we provide the instrument rectifier 22 in shunt to the voltage coil 20 which allows substantially all of the current in the voltage circuit corresponding to voltage $E_m$ to pass through the rectifier 22 instead of coil 20 and is thus prevented from influencing the wattmeter. The voltage across instrument rectifier 22 at this time is of the order of possibly 20 volts so that the negative power through the wattmeter will be .1 × 20 or 2 watts which is too small to cause any detectable error in the desired wattmeter reading corresponding to the active portion of the cycle or positive energy measurement.

On rectifiers where the negative voltage across the main rectifier is below about 1000 volts, we have found that the instrument rectifier represented at 22 may be omitted without serious error. Aside from the higher accuracy obtained with the use of this instrument rectifier it is desirable in that by its use the voltage coil 20 need not be designed for abnormally high voltages. In practice, provision will be made to measure each of the anode circuits as described above, for example, by a permanent meter installation associated with each anode circuit or by shifting the meter circuit connections from one anode circuit to another.

The method of determining the arc drop voltage of the rectifier as above described thus includes a method of measuring the direct current power component of an alternating current circuit which is of general application as indicated in Fig. 3. Here the wattmeter 16 and associated circuit connections are similar to parts correspondingly numbered in Fig. 1. The wattmeter is connected to measure the direct current energy component of the line. With the instrument rectifier connected as represented the meter will measure the power component corresponding to the flow of current in the current and voltage circuits in the directions indicated by the arrows. A watthour meter may be substituted for the wattmeter for the measurement of energy instead of power and where we have used the expression "power", it will be understood to be the patentable equivalent of "energy" and a corresponding breadth of interpretation is intended where not inconsistent.

What we claim as new and desire to secure by Letters Patent of the United States is:

1. Apparatus for measuring a direct-current power component of an alternating-current circuit, comprising in combination with such circuit a direct-current wattmeter having voltage and current coils respectively connected to be influenced by the voltage and current of said circuit, a resistance in the voltage circuit of the wattmeter and an instrument rectifier connected directly in shunt to the voltage coil.

2. Apparatus for measuring the power consumed by vapor rectifiers during the rectifying action, comprising in combination with such a rectifier having cathode and anode, a wattmeter having a current coil connected to be influenced by a current proportional to the arc current and a voltage coil connected across the anode and cathode through a circuit containing a resistance, and an instrument rectifier connected directly in shunt to the voltage coil, the vapor and instrument rectifiers being connected in reverse rectifying relation.

3. Apparatus for measuring the power of rectification consumed in mercury arc rectifiers comprising in combination with such a rectifier having cathode and anode terminals, a direct-current wattmeter having a current coil connected to be influenced by the current through said rectifier and a voltage coil connected in a circuit across the cathode and anode terminals of said rectifier, a resistance in said circuit and an instrument rectifier connected directly in shunt to said voltage coil in reverse rectifying relation to the mercury arc rectifier.

4. Apparatus for measuring the positive power consumption of vapor rectifiers, comprising in combination with a vapor rectifier, a wattmeter having its current and potential coils connected to be responsive to the positive arc current and positive arc drop voltage of the rectifier, and means associated with the voltage circuit of said wattmeter to prevent the negative voltage across the rectifier from influencing the wattmeter.

In witness whereof, we have hereunto set our hands.

CAMIL A. SABBAH.
CHANCY F. WHITNEY.